(12) United States Patent
Rangarajan et al.

(10) Patent No.: US 12,415,516 B2
(45) Date of Patent: Sep. 16, 2025

(54) BRAKING ARRANGEMENT FOR DECELERATING A VEHICLE AND A METHOD THEREOF

(71) Applicant: Mahindra and Mahindra Limited, Tamilnadu (IN)

(72) Inventors: Naveen Rangarajan, Tamilnadu (IN); Krishnam Raju, Tamilnadu (IN); Srinivas Maroju, Tamilnadu (IN); Kvv Srinivasa Rao, Tamilnadu (IN)

(73) Assignee: Mahindra and Mahindra Limited, Tamilnadu (IN)

( * ) Notice: Subject to any disclaimer, the term of this patent is extended or adjusted under 35 U.S.C. 154(b) by 143 days.

(21) Appl. No.: 18/182,633

(22) Filed: Mar. 13, 2023

(65) Prior Publication Data
US 2023/0303074 A1 Sep. 28, 2023

(30) Foreign Application Priority Data
Mar. 24, 2022 (IN) .............................. 202241016716

(51) Int. Cl.
*B60W 30/18* (2012.01)
*B60T 1/06* (2006.01)
(Continued)

(52) U.S. Cl.
CPC ....... *B60W 30/18109* (2013.01); *B60T 1/062* (2013.01); *B60T 7/042* (2013.01); *B60T 13/662* (2013.01); *B60W 10/119* (2013.01); *B60W 10/196* (2013.01); *F16D 67/02* (2013.01); *B60W 2420/403* (2013.01); *B60W 2540/12* (2013.01); *B60W 2710/021* (2013.01)

(58) Field of Classification Search
CPC ......... B60W 30/18109; B60W 10/119; B60W 10/196; B60W 2420/403; B60W 2540/12; B60W 2710/021; B60T 1/062; B60T 7/042; B60T 13/662; F16D 67/02
See application file for complete search history.

(56) References Cited

U.S. PATENT DOCUMENTS

| 9,776,615 B2* | 10/2017 | Matzsuaki ............ B60W 10/30 |
| 2009/0029826 A1* | 1/2009 | Eguchi .................. F16D 48/066 |
| | | 477/39 |

(Continued)

*Primary Examiner* — Phutthiwat Wongwian
*Assistant Examiner* — Susan E Scharpf
(74) *Attorney, Agent, or Firm* — MARSHALL, GERSTEIN & BORUN LLP

(57) ABSTRACT

A braking arrangement (100) for deaccelerating a vehicle is provided. The braking arrangement comprises, a drive clutch unit (104), a secondary clutch-brake unit (106) and an electronic control unit (108). When the brake pedal (114) is operated, the sensor (112) senses the movement of the brake pedal (114) and provides sensed signal to the control unit (108). The control unit (108) generates and transmits the control signal to the control valves (110) which in turn triggers solenoids of both the control valve (108) and an engagement is provided to the drive clutch unit (104) and secondary clutch-brake unit (106) respectively. At first the drive clutch unit (104) is engaged automatically irrespective of the vehicle drive mode. Gradually the secondary clutch-brake unit (106) is actuated. The present arrangement provides expedited deacceleration of the vehicle over conventional arrangements.

20 Claims, 3 Drawing Sheets

(51) Int. Cl.
*B60T 7/04* (2006.01)
*B60T 13/66* (2006.01)
*B60W 10/119* (2012.01)
*B60W 10/196* (2012.01)
*F16D 67/02* (2006.01)

(56) References Cited

U.S. PATENT DOCUMENTS

| | | | |
|---|---|---|---|
| 2011/0314960 A1* | 12/2011 | Yoshimura | B60W 10/14 |
| | | | 74/650 |
| 2016/0046278 A1* | 2/2016 | Matsuzaki | B60W 10/08 |
| | | | 903/930 |
| 2021/0339749 A1* | 11/2021 | Takaira | B60W 10/119 |
| 2021/0380111 A1* | 12/2021 | Tabata | B60K 6/547 |
| 2023/0303074 A1* | 9/2023 | Rangarajan | B60W 30/18109 |

* cited by examiner

BRAKING ARRANGEMENT FOR DECELERATING A VEHICLE AND A METHOD THEREOF

FIELD

The present invention relates to the field of braking arrangements for deaccelerating a vehicle.

BACKGROUND

The background information herein below relates to the present disclosure but is not necessarily prior art.

Brakes are used in slowing or stopping a moving vehicle. Different brakes are available in the market that provides different braking experience. The brakes are generally applied to rotating axles or wheels. As better vehicles capable of reaching higher speed is being developed and produced, better braking arrangement for improved deacceleration of a vehicle is required.

Further, the American Society of Agricultural and Biological Engineers (ASABE) in its revised guidelines requires 3.55 m/s2 of deacceleration for vehicle's speed less than 30 Km/hr speed and 5 m/s2 for the vehicles with speed more than 30 Km/hr.

However, conventional brakes are provided on all the four wheels with hydraulic assisted to achieve the ASABE standards. Providing bigger and bulkier brakes in all the wheels to achieve the ASABE standards is space consuming, non-economical and leads to wheel lock and skidding.

There is, therefore, felt a need to for a braking arrangement for deaccelerating a vehicle, for alleviating the aforementioned drawbacks of prior art.

OBJECTS

Some of the objects of the present disclosure, which at least one embodiment herein satisfies, are as follows:

An object of the present disclosure is to provide a braking arrangement for deaccelerating a vehicle and a method thereof.

Another object of the present disclosure is to provide the braking arrangement for deaccelerating a vehicle that meets the ASABE standards.

Still another object of the present disclosure is to provide the braking arrangement for deaccelerating a vehicle that is economical, easy to install and maintain.

Other objects and advantages of the present disclosure will be more apparent from the following description, which is not intended to limit the scope of the present disclosure.

SUMMARY

The present disclosure envisages a braking arrangement for deaccelerating a vehicle. A clutch unit is provided on a power transmission shaft of the vehicle. The clutch unit transfers power from the power transmission shaft to a secondary wheel drive. A secondary clutch-brake unit is provided on the power transmission shaft. The secondary clutch-brake unit engages the power transmission shaft for absorption and transfer of power in the power transmission shaft to a housing of the power transmission unit. A plurality of control valves controls the clutch unit and the secondary clutch-brake unit respectively through a pressurised fluid. At least one sensor located in proximity of a brake pedal. The sensor senses the activation and deactivation of the brake pedal. The sensor generates a sensed signal. An electronic control unit electronically connected to the control valves and the sensor. The electronic control unit receives sensed signal from the sensor, generates and transmit control signals to the control valves, thereby providing engagement of the clutch unit and the secondary clutch-brake unit respectively to deaccelerate the vehicle.

In an embodiment, at least two ports are defined on the power transmission shaft. Each of the ports are configured to provide the pressured fluid to the control valves.

In another embodiment, splines are defined on the power transmission shaft. The splines are configured on an operative surface of the power transmission shaft to mount the clutch unit and the secondary clutch-brake unit.

In an embodiment, the plurality of control valves includes only two valves.

In an embodiment, the housing of the power transmission unit is a rigid housing.

In yet another embodiment, the clutch-brake unit consists of a main drum housing, an actuating piston and a plurality of brake liners.

In an embodiment, the electronic control unit is configured to generate and transmit a sequential control signal to the control valves in response to the receive sensed signal from the sensor. The control valves are configured to provide sequential engagement of the clutch unit and the secondary clutch-brake unit respectively to deaccelerate the vehicle, based on the transmitted sequential control signal.

In yet another embodiment, the brake liners are connected to a brake plate provided with splines. The brake plate is further connected to the rigid housing of the transmission unit to absorb and transfer the brake force.

In an embodiment, the clutch unit is a four-wheel drive clutch unit.

In yet another embodiment, the vehicle further contains a switching means to shift the mode of the vehicle form a two-wheel drive mode to a four-wheel drive mode.

In yet another embodiment, said electronic control unit may involve a Transmission Control Unit (TCU), sensors and a modulation curve implemented operational unit.

In yet another embodiment, the clutch unit and the secondary clutch-brake unit is selected from the group consisting of dry clutch unit and wet clutch unit.

In yet another embodiment, the sensor is selected form the group consisting of Passive infrared sensor, Microwave sensor, Dual technology motion sensor, Area reflective sensor, Ultrasonic sensor, Vibration motion sensor, Contact sensor and Video motion sensor.

The present disclosure also provides a method of deaccelerating a vehicle. The method comprises the following steps:
  sensing activation of the brake pedal of the vehicle by the at least sensor;
  generating and transmitting sensed signal to the electronic control unit;
  generating and transmitting control signals by the electronic control unit to at least two control valves provided to control the clutch unit and the secondary clutch-brake unit respectively through a pressurised fluid;
  activating the clutch unit disposed on the power transmission shaft for transferring of power from the power transmission shaft to at least secondary wheel drive of the vehicle; and
  activating the secondary clutch-brake unit disposed on the power transmission shaft in series with the clutch unit for absorption and transferring of power from the power transmission shaft to a housing of the transmission unit to deaccelerate the vehicle.

In an embodiment, the method of generating and transmitting control signals, the clutch unit is a four-wheel drive clutch unit.

BRIEF DESCRIPTION OF THE DRAWINGS

The braking arrangement for deaccelerating a vehicle and a method thereof of the present disclosure will now be described with the help of the accompanying drawing, in which.

LIST OF REFERENCE NUMERALS

100—Braking Arrangement
102—Power transmission shaft
104—Four-wheel drive clutch unit
106—Secondary clutch-brake unit
108—Electronic control unit
110—Control valves
112—Sensor
114—Brake pedal
116—Ports
118—Splines

DETAILED DESCRIPTION

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on," "engaged to," "connected to," or "coupled to" another element, it may be directly on, engaged, connected or coupled to the other element.

Figure 1:
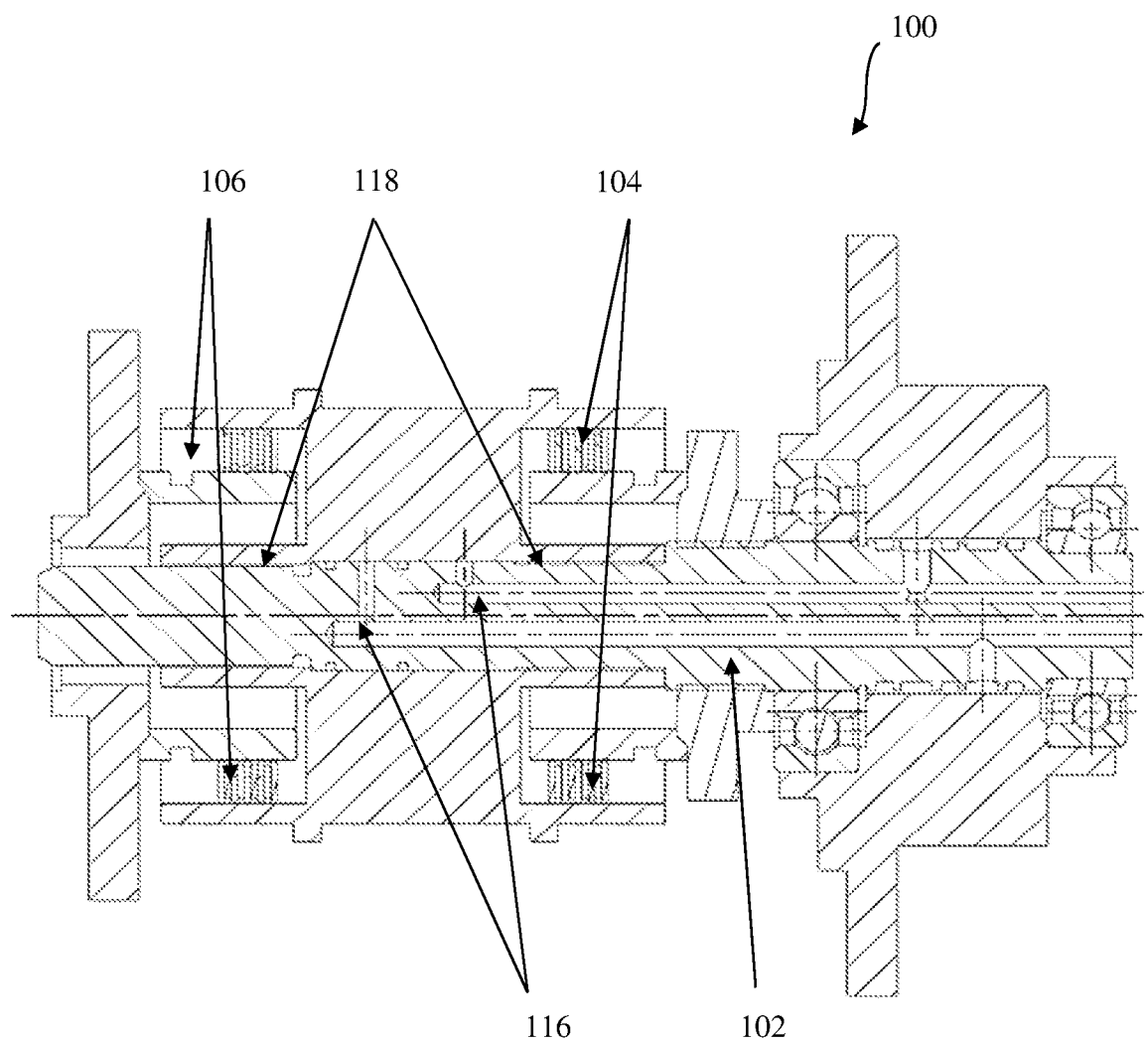
FIG. 1 illustrates a sectional view of the braking arrangement in accordance with an embodiment of the present disclosure.
Figure 2:
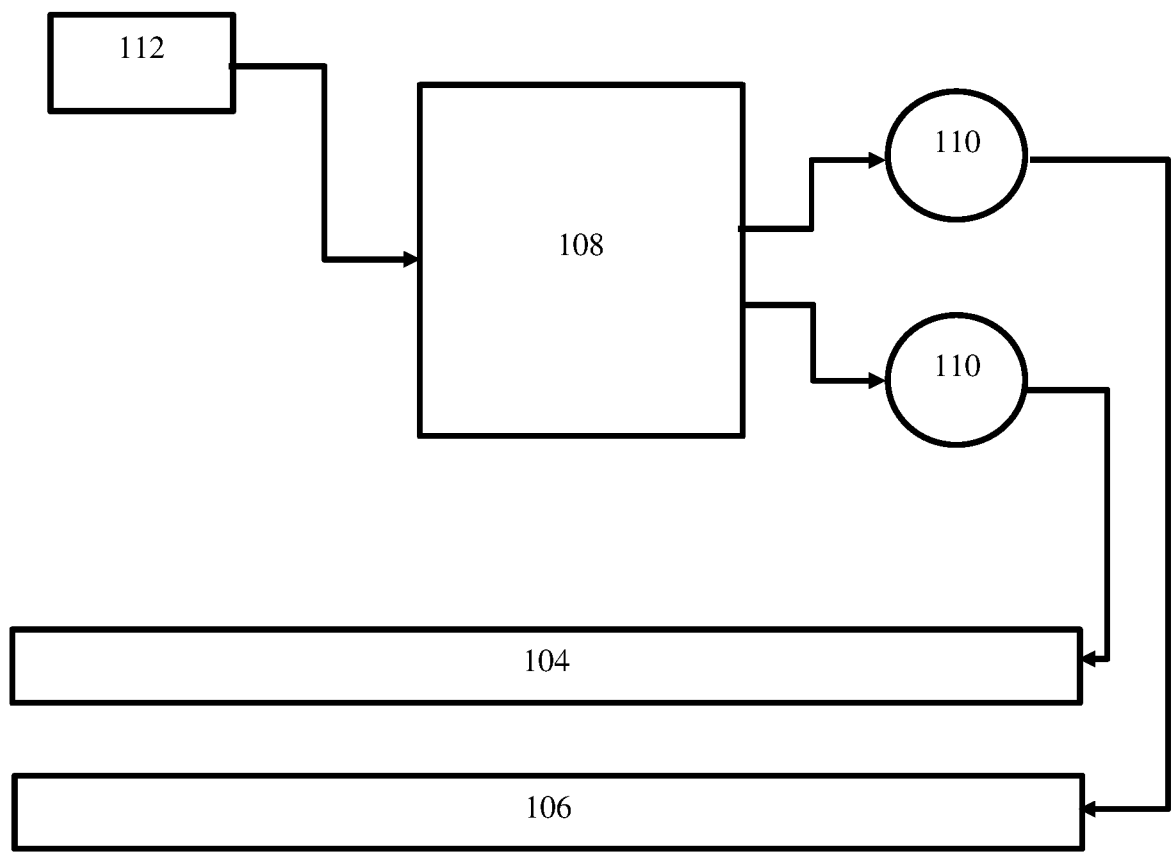
FIG. 2 illustrates a flow diagram depicting the operation of the braking arrangement of FIG. 1.
Figure 3:
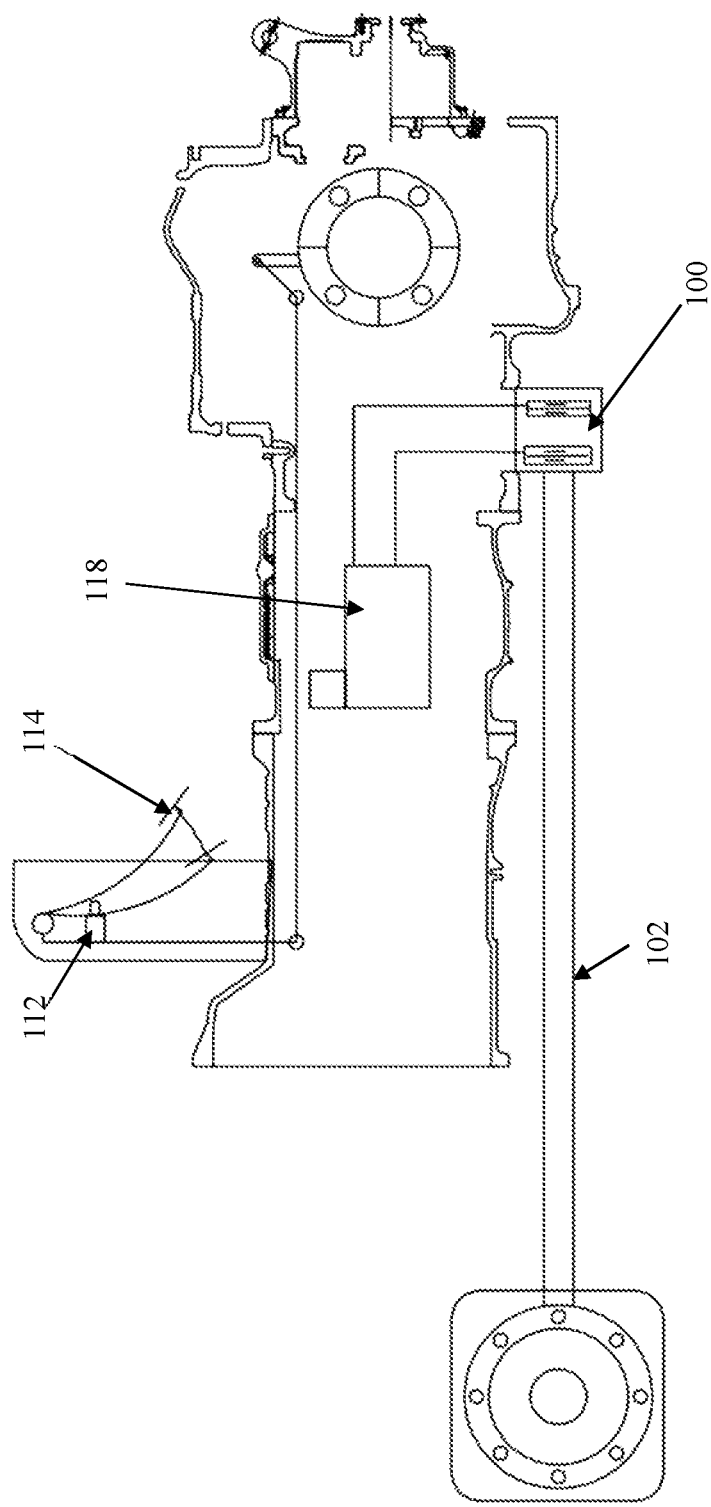
FIG. 3 illustrates a schematic of the braking arrangement in accordance with an embodiment of the present disclosure.

Referring to FIG. 1-3, the present disclosure envisages a braking arrangement 100 for deaccelerating a vehicle. The braking arrangement comprises a power transmission unit, a four-wheel drive clutch unit 104, a secondary clutch-brake unit 106 and an electronic control unit 108.

The power transmission unit provided with a power transmission shaft 102. The power transmission shaft 102 transfers the power generated in the prime mover to the wheels of the vehicle through gear and clutch mechanism. During two-wheel drive mode, the power generated in the prime mover is transferred to the primary wheel drive using the power transmission shaft and the clutch drive. The primary wheel drive may be rear wheel drive in a rear-wheel-drive vehicle.

The four-wheel drive clutch unit 104 is disposed on the power transmission shaft 102. The four-wheel drive clutch unit 104 is provided to convert the vehicle from two-wheel drive mode to four-wheel drive mode. The four-wheel drive clutch unit 104 when engaged transfer the power from the power transmission shaft 102 to the secondary wheel drive. The secondary wheel drive may be front wheel drive in a rear-wheel-drive vehicle.

The secondary clutch-brake unit 106 is disposed on the power transmission shaft 102. The secondary clutch-brake unit 106 is disposed such that it is in series with the four-wheel drive clutch unit 104. Further the secondary clutch-brake unit 106 is rigidly connected to the housing of the power transmission unit. The secondary clutch-brake unit along with four-wheel drive clutch unit and conventional brakes on all four wheels. The secondary clutch-brake unit can be controlled through hydraulic valves with inbuilt electronic logic. This is additional to the existing Auto four-wheel drive clutch unit.

The power transmission shaft 102 is further provided with splines 118 on its surface. The splines 118 provide rigid mounting of the four-wheel drive clutch unit 104 and said secondary clutch-brake unit 106.

The secondary clutch-brake unit 106 when engaged with the power transmission shaft absorbs and transfers the power in the power transmission shaft 102 to the housing of the power transmission unit. There by reducing the power availability at the wheels and assisting in the improved deacceleration of the vehicle.

The electronic control unit 108 provides sequential engagement of the four-wheel drive clutch unit 104 and the secondary clutch-brake unit 106.

Typically, the braking arrangement 100 includes at least two control valves 110. Each control valves 110 is electronically connected to the electronic control unit 108 and fluidly connected to the four-wheel drive clutch unit 104 and the secondary clutch-brake unit 106 respectively.

The braking arrangement 100 includes at least one sensor 112. The sensor 112 is located near the brake pedal 114 of the vehicle and electronically connected to the electronic control unit 108. The sensor 112 senses the activation and deactivation of the brake pedal 114 and transmits the sensed signal to the electronic control unit 108 accordingly.

Based on the sensed signal received from the sensor 112, the electronic control unit 108 generates and transmits control signals to the control valves 110. Based on the control signal received from the electronic control unit 108 the control valves 110 control the four-wheel drive clutch unit 104 and the secondary clutch-brake unit 106 through a pressurised fluid.

The power transmission shaft 102 has at least two ports 116. The ports 116 are in fluid communication with the control valves 110. The ports 116 provide passage to the pressurised fluid into the control valves 110.

Typically, the four-wheel drive clutch unit 104 and the secondary clutch-brake unit 106 is selected from the group consisting of dry clutch unit and wet clutch unit.

The secondary clutch-brake unit 106 is mounted on the power transmission shaft 102 through splines 118 and the entire assembly is supported by bearings. During normal operational conditions the power generated in the prime mover is provided to the primary wheel drive. Under four-wheel drive condition, the control valve 110 receives control signal from the control unit 108 and allows pressurized fluid to the four-wheel drive clutch unit 104. Due to which the four-wheel drive clutch unit 104 engages the power transmission shaft 102 and the power is now transferred to the secondary wheel drive through the four-wheel drive clutch unit 104. The power transmission shaft 102 is further connected to a front axle through a propeller shaft. Hence all wheels receive power.

The secondary clutch-brake unit 106 consists of a main drum housing an actuating piston and plurality of brake liners. The brake liners are connected to a brake plate with splines which intern is connected to the rigid housing of the transmission unit to absorb and transfer brake force.

The electronic control unit 108 may involve a Telematic Control Unit (TCU), sensors and a modulation curve implemented operational unit.

The sensor 112 is selected form the group consisting of Passive infrared sensor, Microwave sensor, Dual technology motion sensor, Area reflective sensor, Ultrasonic sensor, Vibration motion sensor, Contact sensor and Video motion sensor.

Typically, said vehicle may contain a switching means. Switching means when operated shifts the mode of the vehicle form the two-wheel drive mode to the four-wheel drive mode.

In an operative configuration, when the brake pedal 114 is operated, the sensor 112 senses the movement of the brake pedal 114 and provides sensed signal to the control unit 108. The control unit intern generates and transmits the control signal to the control valves 110 which in turn triggers solenoids of both the control valves 108 and a sequential engagement is provided to the four-wheel drive clutch unit 104 and the secondary clutch-brake unit 106 respectively. At first the four-wheel drive clutch unit 104 is engaged automatically irrespective of the vehicle being in four-wheel drive mode or in two-wheel drive mode. Gradually the secondary clutch-brake unit 106 is actuated.

The braking arrangement of the present disclosure assist in providing additional braking force to the secondary wheel drive in addition to the conventional brakes provided at the wheels. There are two primary advantages by the present arrangement. The first being that the torque/power available at the primary wheel drive during braking is distributed and transferred to the secondary wheel drive by engaging the auto four-wheel drive clutch unit 104. Secondly, over and above, the braking action assist in diminishing the torque/power available to the secondary wheels. Hence the power in the power transmission shaft is diminished within a short period of time and provides expedited deacceleration of the vehicle.

Once the brake pedal 114 is released, both the four-wheel drive clutch unit 104 and secondary clutch-brake unit 106 will revert to neutral if the vehicle is in two-wheel drive condition. In case the vehicle is in four-wheel drive condition only the secondary clutch-brake unit 106 will revert to neutral.

The present disclosure also provides a method of deaccelerating the vehicle. The method comprises the following steps:
sensing activation of the brake pedal 114 of the vehicle by the sensors 112;
generating and transmitting sensed signal to the electronic control unit 108;
generating and transmitting control signals by the electronic control unit 108 to at least two control valves 108 provided to control the four-wheel drive clutch unit 104 and the secondary clutch-brake unit 16 respectively through a pressurised fluid;
activating the four-wheel drive clutch unit 104 disposed on the power transmission shaft 102 for transferring of power from the power transmission shaft 102 to at least secondary wheel drive of the vehicle; and
activating the secondary clutch-brake unit 106 disposed on the power transmission shaft 102 in series with the four-wheel drive clutch unit 104 for absorption and transferring of power from the power transmission shaft 102 to a housing of the transmission unit to deaccelerate the vehicle.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a braking arrangement for deaccelerating a vehicle that:
provides additional brake force to the conventional brakes;
meets the ASABE standards for deaccelerating a vehicle;
distributes and transfer the torque/power available at the primary wheel drive during braking to the secondary wheel drive by engaging the auto four-wheel drive clutch unit;
assist the breaking action in diminishing the torque/power available to the secondary wheels;
diminish the power in the power transmission shaft within a short period of time
provides expedited deacceleration of the vehicle.
is easy to operate;
is economical; and
has low maintenance.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A braking arrangement (100) for deaccelerating a vehicle, said arrangement (100) comprising:
    a clutch unit (104) provided on a power transmission shaft (102) of the vehicle to transfer power from the power transmission shaft (102) to a secondary wheel drive;
    a secondary clutch-brake unit (106) provided on the power transmission shaft (102) to engage with the power transmission shaft (102) for absorption and transfer of power in said power transmission shaft (102) to a housing of a power transmission unit;
    a plurality of control valves (110) configured to control said clutch unit (104) and said secondary clutch-brake unit (106) respectively through a pressurised fluid;
    at least one sensor (112) located in proximity of a brake pedal (114) and configured to sense the activation and deactivation of the brake pedal (114), said sensor configured to generate sensed signals; and
    an electronic control unit (108) electronically connected to said control valves (110) and said sensor (112) to receive sensed signal from said sensor (112) and generate and transmit control signals to said control valves (110), thereby providing engagement of said clutch unit (104) and said secondary clutch-brake unit (106) respectively to deaccelerate the vehicle.

2. The braking arrangement (100) as claimed in claim 1, wherein at least two ports (116) are defined on said power transmission shaft (102).

3. The braking arrangement (100) as claimed in claim 2, wherein each of said ports (116) are configured to provide said pressured fluid to said control valves (110).

4. The braking arrangement (100) as claimed in claim 1, wherein splines (118) are defined on said power transmission shaft (102).

5. The braking arrangement (100) as claimed in claim 4, wherein said splines (118) are configured on an operative surface of said power transmission shaft (102) to mount said clutch unit (104) and said secondary clutch-brake unit (106) thereon.

6. The braking arrangement (100) as claimed in claim 1, wherein said plurality of control valves includes at least two control valves.

7. The braking arrangement (100) as claimed in claim 1, wherein said housing of said power transmission unit is a rigid housing.

8. The braking arrangement (100) as claimed in claim 4, wherein said clutch-brake unit (106) consists of a main drum housing, an actuating piston and a plurality of brake liners.

9. The braking arrangement (100) as claimed in claim 8, wherein said brake liners are connected to a brake plate provided with splines, said brake plate is further connected to the housing of the transmission unit to absorb and transfer the brake force.

10. The braking arrangement (100) as claimed in claim 1, wherein said electronic control unit (108) is configured to generate and transmit a sequential control signal to said control valves (110) in response to the receive sensed signal from said sensor (112).

11. The braking arrangement (100) as claimed in claim 10, wherein said control valves (110) is configured to provide sequential engagement of said clutch unit (104) and said secondary clutch-brake unit (106) respectively to deaccelerate the vehicle, based on said transmitted sequential control signal.

12. The braking arrangement (100) as claimed in claim 1, wherein a switching means is provided with said vehicle, said switching means is configured to shift the mode of the vehicle form a two-wheel drive mode to a four-wheel drive mode.

13. The braking arrangement (100) as claimed in claim 12, wherein said clutch unit (104) is configured to transfer power from said power transmission shaft (102) to the secondary wheel drive in said four drive mode.

14. The braking arrangement (100) as claimed in claim 1, wherein said electronic control unit (108) consists of a Transmission Control Unit (TCU), sensors and a modulation curve implemented operational unit.

15. The braking arrangement (100) as claimed in claim 1, wherein said clutch unit (104) and the secondary clutch-brake unit (106) is selected from the group consisting of dry clutch unit and wet clutch unit.

16. The braking arrangement (100) as claimed in claim 1, wherein said sensor (112) is selected form the group consisting of Passive infrared sensor, Microwave sensor, Dual technology motion sensor, Area reflective sensor, Ultrasonic sensor, Vibration motion sensor, Contact sensor and Video motion sensor.

17. The braking arrangement (100) as claimed in claim 1, wherein said vehicle is a selectively four-wheel drive vehicle.

18. The braking arrangement (100) as claimed in claim 1, wherein said clutch unit (104) is a four-wheel drive clutch unit.

19. A method of deaccelerating a vehicle, said method comprising the following steps:
   sensing activation of a brake pedal (114) of the vehicle by at least one sensor (112);
   generating and transmitting sensed signal to an electronic control unit (108);
   generating and transmitting control signals by said electronic control unit (108) to at least two control valves (110) provided to control a clutch unit (104) and a secondary clutch-brake unit (106) respectively through a pressurised fluid;
   activating said clutch unit (104) disposed on a power transmission shaft (102) for transferring of power from said power transmission shaft (102) to at least secondary wheel drive of said vehicle; and
   activating said secondary clutch-brake unit (106) disposed on said power transmission shaft (102) in series with said clutch unit (104) for absorption and transferring of power from said power transmission shaft (102) to a housing of said transmission unit to deaccelerate the vehicle.

20. The method of deaccelerating a vehicle as claimed in claim 19, wherein in said method of generating and transmitting control signals, said clutch unit (104) is a four-wheel drive clutch unit.

\* \* \* \* \*